(12) United States Patent
Sorg (10) Patent No.: US 12,199,416 B2
(45) Date of Patent: Jan. 14, 2025

(54) DEVICE FOR STRIPPING A CABLE AND SYSTEM FOR FABRICATING A CABLE

(71) Applicant: Metzner Holding GmbH, Ulm (DE)

(72) Inventor: Manfred Sorg, Ulm (DE)

(73) Assignee: Metzner Holding GmbH, Ulm (DE)

( * ) Notice: Subject to any disclaimer, the term of this patent is extended or adjusted under 35 U.S.C. 154(b) by 497 days.

(21) Appl. No.: 17/608,924

(22) PCT Filed: May 19, 2020

(86) PCT No.: PCT/EP2020/063899
§ 371 (c)(1),
(2) Date: Nov. 4, 2021

(87) PCT Pub. No.: WO2020/239522
PCT Pub. Date: Dec. 3, 2020

(65) Prior Publication Data
US 2022/0239078 A1 Jul. 28, 2022

(30) Foreign Application Priority Data

May 27, 2019 (DE) .......................... 102019114178.8
Jul. 19, 2019 (DE) .......................... 102019119662.0

(51) Int. Cl.
*H02G 1/12* (2006.01)

(52) U.S. Cl.
CPC ........... *H02G 1/1265* (2013.01); *H02G 1/127* (2013.01); *Y10T 29/514* (2015.01)

(58) Field of Classification Search
CPC .... H02G 1/1265; H02G 1/127; H02G 1/1297; Y10T 29/514

USPC ....................... 29/564.4, 564.1, 566.1, 566.3
See application file for complete search history.

(56) References Cited

U.S. PATENT DOCUMENTS

| | | | |
|---|---|---|---|
| 5,010,797 A * | 4/1991 | Stepan | H02G 1/1265 83/885 |
| 6,308,417 B1 | 10/2001 | Ducret | |
| 7,597,030 B2 * | 10/2009 | Stepan | G02B 6/566 81/9.42 |
| 8,234,772 B2 | 8/2012 | Locher | |
| 2016/0126707 A1 | 5/2016 | Ishigure | |

FOREIGN PATENT DOCUMENTS

| | | |
|---|---|---|
| CN | 101147305 A | 3/2008 |
| CN | 103094814 A | 5/2013 |
| CN | 107534276 A | 1/2018 |
| CN | 207117066 U | 3/2018 |
| CN | 108155606 A | 6/2018 |
| CN | 207691335 U | 8/2018 |

(Continued)

OTHER PUBLICATIONS

Chinese Office Action issued in App. No. CN202080038900, dated Sep. 19, 2023, 11 pages.

*Primary Examiner* — Thiem D Phan
(74) *Attorney, Agent, or Firm* — Koffsky Schwalb LLC (57) ABSTRACT

A device for stripping a cable, comprising a stripping apparatus for cutting in and for pulling off a portion of a cable component. The stripping apparatus has a rotation head, which can be rotated about a central axis (M) and on which a blade and a counter-holder for the cable are arranged opposite one another in such a way that the blade and the counter-holder are directed at the central axis (M).

20 Claims, 4 Drawing Sheets

(56) References Cited

FOREIGN PATENT DOCUMENTS

| | | |
|---|---|---|
| DE | 102016106238 A1 | 7/2017 |
| EP | 0297484 A1 | 1/1989 |
| EP | 1071175 A1 | 1/2001 |
| EP | 0927444 B1 | 12/2003 |
| EP | 1271729 B1 | 6/2006 |
| JP | 2001211520 A | 8/2001 |
| JP | 2001292515 A | 10/2001 |
| JP | 2016134940 A | 7/2016 |
| WO | 9813907 A1 | 4/1998 |
| WO | 0049685 A1 | 8/2000 |

\* cited by examiner

Fig. 9

DEVICE FOR STRIPPING A CABLE AND SYSTEM FOR FABRICATING A CABLE

BACKGROUND

The invention relates to a device for stripping a cable, having a stripping installation for cutting into and pulling off a portion of a cable component of the cable.

The invention furthermore relates to a method for stripping a cable, according to which method the cable is introduced along a central axis into a stripping installation in which a rotary head rotates about the central axis.

The invention moreover relates to a computer program product, to a rotary head for a device for stripping a cable, as well as to a system for fabricating an electric cable.

There is demand in terms of supplying the industry with cables which are cut to a defined length and stripped on at least one end. To this end, stripping devices are known from the prior art, reference being made thereto in a purely exemplary manner by way of EP 1 271 729 B1 and EP 0 927 444 B1.

In the known devices for stripping a cable, the cable, which is in most instances a so-called continuous cable, is introduced into the device. The device here has a stripping cutter. A cable component of the cable is scored or cut off at a defined axial position by the cutter. The cable is subsequently actuated axially onto a pull-off tool by which the portion of the cable component that has at least been partially severed by means of the stripping cutter is stripped. This procedure is comparatively complex, in particular in the context of fully automated cable processing.

The stripping of a cable typically takes place in the context of a cable fabrication. The conductors of the cable here are typically connected to a plug connector so as to subsequently be able to establish electrical connections to other cables or conductors, respectively, which have corresponding plug connectors or mating plug connectors, respectively. A plug connector or mating plug connector, respectively, can be a plug, an installation plug, a socket, a coupling or an adapter. The term "plug connector" or "mating plug connector", respectively, used in the context of the invention represents all variants.

High requirements in terms of the ruggedness and the safety of plug connectors and cables are set in particular for plug connectors and cables for the automotive industry, or for vehicles, respectively. Electric mobility above all sets great challenges for the automotive industry and the suppliers thereof, since high currents with voltages up to 1500 V are at times transmitted by way of the cables or lines, respectively, in the vehicles. Given the danger which would be consequential to a failure of components in an electric vehicle, particularly high requirements have to be accordingly set in terms of the quality of the cables or lines, respectively, and plug connections.

The cable and the plug connection thus have to at times withstand high stresses, for example mechanical stresses. Shorting with surrounding conductive components must be precluded. Accordingly, great care has to be taken in particular when fabricating and stripping the cable so as for example not to damage any shields and insulations of the cable, for example unintentionally scoring those shields and insulations as a result of the stripping by the stripping cutter.

A further requirement set for plug connectors for the automotive industry lies in that said plug connectors have to be able to be economically produced in high volumes. For this reason, ideally fully automated cable fabrication and stripping is preferable in particular for processing cables for the automotive industry. Corresponding production lines thus have to be established in order to achieve the required volumes and at the same time a high level of quality.

A particular problem often lies in that the pull-off tools do not ideally engage in the incisions generated by means of the stripping cutter, this being in particular by virtue of the elasticity of the cable sheath and a cable geometry which is typically not ideally round. Accordingly, the stripping cutters have to have comparatively wide cutting edges and also cut deeply into the cable component, this potentially leading to damage to cable components. This can ultimately increase the processing time of the cable as well as the reject rate and thus compromise the economic viability of automated processing, or of a production line, respectively.

Considering the known prior art, the object of the present invention lies in providing a device for stripping a cable which is particularly suitable for an automated cable fabrication in the context of mass production.

The present invention is also based on the object of providing a method for stripping a cable which is particularly suitable for an automated cable fabrication in the context of mass production.

It is finally also an object of the invention to provide an advantageous computer program product for carrying out a method for stripping an electric cable, as well as a rotary head for a device for stripping a cable.

It is moreover an object of the invention to provide an advantageous system for fabricating an electric cable which is particularly suitable for an automated cable fabrication in the context of mass production.

SUMMARY OF THE INVENTION

Provided is a device for stripping a cable, said device having a stripping installation for cutting into and pulling off a portion of a cable component. The stripping installation has a rotary head which is rotatable about a central axis and on which a cutter and a counter holder for the cable are disposed opposite one another so as to be aligned toward the central axis. The cable in the stripping installation is guided along the central axis.

The cable is preferably configured as a high-voltage line.

The region of the cable in which the processing according to the invention predominantly takes place will hereunder at times also be referred to as the "cable portion to be processed". The cable portion to be processed can be a cable end piece. Two cable portions of the cable, in particular both cable end pieces, are preferably processed or stripped/fabricated, respectively.

The invention can in particular be provided for automated or fully automated stripping and/or fabricating of an electric cable.

In principle, an arbitrary cable may be processed in the context of the invention. The cable preferably has an outer conductor, or is configured as a shielded electric cable, respectively.

The invention is particularly advantageously suitable for processing electric cables with a large cross section for transmitting high currents, for example in the automotive sector, particularly preferably in the field of electric mobility. An electric cable for the high-voltage range, in particular a high-voltage line, can thus be provided.

The electric cable can in particular have an arbitrary number of inner conductors, for example also only a single inner conductor. Two inner conductors or more inner conductors, three inner conductors or more inner conductors, four inner conductors or even more inner conductors, can also be provided. To the extent that the cable has a plurality of inner conductors, the latter can run through the cable so as to be twisted, in the manner of a twisted pair cable known from the field of telecommunications or broadcasting technology, respectively. However, the inner conductors may also be guided in parallel in the cable.

The electric cable is particularly preferably configured as a coaxial cable having exactly one inner conductor and exactly one outer conductor, or as a shielded cable having exactly one outer conductor and exactly two inner conductors.

According to the invention, the cutter is able to be actuated in the direction toward the central axis onto the cable so as to at a defined axial position generate a radial incision in the cable component of the cable.

In the context of the invention, the cable component can be any arbitrary cable component. The invention is however particularly suitable for removing the insulation, or the dielectrics, respectively, from the most varied types of cables. The cable component according to the invention can thus in particular be a cable sheath of the cable, a filler which encases conjointly a plurality of inner conductors, an insulation (also referred to as the "primary insulation") which encases individually a respective inner conductor, and/or be a dielectric of the cable.

The invention can however also be used for stripping other kinds of cable components, for example also for stripping a cable film or an outer conductor of the cable, for example a braided cable shield.

In the context of the invention, the severed or at least partially severed axial portion of the cable component is referred to as the "portion".

In the context of the invention, the portion is to be completely or partially pulled off from the electric cable. In principle, a distinction can be made between what is referred to as completely pulling off and partially pulling off. Completely pulling off is to be understood such that the stripped piece, or the portion of the cable component, respectively, (i.e. the "stripping waste") is completely pulled off from the cable. When partially pulling off, the cut-off portion is pulled off from the cable only over a specific axial length and thus still remains on the cable. The later user, or a downstream device in the context of a system for fabricating the electric cable, can then completely pull off the partially pulled-off portion. Partial pulling off has the advantage that the cable end remains protected during further transportation and also during storage and for example fanning-out of further cable components on the cable end is avoided. Partial pulling off of the portion is therefore typically preferred.

The cutter (also referred to as the "stripping cutter") and the counter holder are preferably disposed on a radial line, or a straight line, respectively, which extends through the central axis of the rotary head. In the event of a linear movement of the cutter and/or of the counter holder, said cutter and counter holder can consequently directly converge or diverge.

The invention can particularly advantageously be used for first removing the cable sheath from a cable so as to expose an outer conductor or a shield, respectively, for example a braided cable shield of the cable. The outer conductor can subsequently be removed, preferably offset axially in the longitudinal direction, or the advancing direction, respectively, along the central axis. Finally, an insulation, or a dielectric, respectively, disposed below the outer conductor can be removed, preferably again axially offset in the longitudinal direction or the advancing direction, respectively, of the cable, so as to render for example one or a plurality of inner conductors of the cable accessible for the cable fabrication. Multi-stage stripping of the cable in the longitudinal direction or the advancing direction, respectively, can thus take place.

The invention can be used for stripping one or a plurality of cable components of the cable.

It can thus be provided that stripping is carried out sequentially, thus in a plurality of successive operating steps, at a plurality of locations of the cable and/or with a plurality of cutting depths. It can however also be provided that stripping or de-sheathing, respectively, is carried out simultaneously, thus in one operating step, at a plurality of locations of the cable and/or with a plurality of cutting depths, wherein the device can be conceived to this end by using a corresponding number of axially offset cutters, counter holders and/or pull-off tools (on a common rotary head or on a plurality of axially offset rotary heads).

It is provided according to the invention that the stripping device has at least one pull-off tool which is disposed on the rotary head and in the direction of the central axis able to be actuated onto the cable. The pull-off tool in relation to the cutter is positioned in such a manner that the pull-off tool for pulling off the portion of the cable component engages in the incision generated by the cutter when the pull-off tool is actuated onto the cable.

In a particularly preferred refinement of the invention it can be provided that the cutter and the at least one pull-off tool are disposed next to one another on the rotary head and spaced so as to be equidistant from an end side of the rotary head. The counter holder can also be correspondingly positioned.

The cutter and the at least one pull-off tool can be disposed on the rotary head in such a manner that said cutter and said pull-off tool assume the same axial position along the cable when said cutter and said pull-off tool are actuated onto the cable, or onto the central axis, respectively, without the cable having to be axially repositioned.

As a result of the cutter as well as the pull-off tool being conjointly disposed on the same rotary head, the cable after the incision by means of the cutter does not have to be repositioned and again actuated onto the pull-off tool (or vice versa). The position of the incision generated by means of the cutter relative to the rotary head is thus unequivocally known. As a result, the pull-off tool can be accurately aligned in such a manner that the latter can ideally engage in the incision so as to pull off the portion from the cable. An exact engagement of the pull-off tool in the incision according to the invention can even be guaranteed in the presence of large tolerances in the cable geometry.

The cutting edge of the cutter can advantageously be very thin, and the region of the pull-off tool by way of which the pull-off tool engages in the incision can in contrast be comparatively wide, this simplifying the processing, on the one hand, and precluding damage to the cable and the components thereof. The cutting edge of the cutter is thus preferably thinner than the engagement region of the pull-off tool by way of which the pull-off tool engages in the incision.

As a result of the engagement region, or the "cutter blade", respectively, of the at least one pull-off tool being able to be configured wider according to the invention, the at least one pull-off tool can be configured so as to be more robust than the known pull-off tools. Breaking of the pull-off tool can be avoided as a result, and the service life of the device can be extended.

It has furthermore been demonstrated that the radial cutting depth of the cutter in the cable component can be reduced by virtue of the almost ideal alignment of the cutter and the pull-off tool as a result of the conjoint positioning on the rotary head, because the portion as a result of the ideal engagement of the pull-off tool in the incision can be reliably pulled off, or separated/torn off, respectively, even when the cutter has not completely cut through the cable component. As a result of the reduction in terms of the cutting depth, damage to cable components situated below the portion can be precluded even in the case of cables which are comparatively out-of-round due to tolerances. The cutting depth as a function of the cross-section of the cable component can advantageously be chosen in such a manner that a narrow annular segment which connects the portion to the remainder of the cable component still remains after the incision. It can thus be provided that a groove, in particular a completely encircling groove, and thus a predetermined breaking point, is incorporated in the cable component, the pull-off tool for pulling off the portion later being able to engage in said groove.

It is to be highlighted that the cutter and the at least one pull-off tool in the context of the invention are preferably mutually independent structural groups.

By virtue of the rotation of the rotary head, the solution according to the invention advantageously enables the cutter to cut into the cable in an encircling or fully surrounding manner, respectively, as a result of which the portion of the cable component can be pulled off from the cable particularly easily and reliably in terms of the process.

In an advantageous refinement of the invention it can be provided that the device has a transport installation for conveying the cable in a linear manner in an advancing direction so as to actuate the cable along the central axis into the stripping installation.

The transport installation can be, for example, a roller conveyor installation having one, two, or even more, rollers so as to guide the electric cable in a linear manner between the rollers. A belt conveyor or any other conveying installation can also be provided for actuating the cable and/or the stripping installation.

As an alternative or in addition to a transport installation, it can also be provided, for example, that an operator moves the cable in a linear manner along the advancing direction so as to actuate the cable along the central axis into the stripping installation.

In a refinement of the invention it can be provided that the rotary head is configured as the disk and a belt drive is provided for rotating the disk.

A configuration of the rotary head as a disk has proven particularly suitable for radially feeding the cutter and optionally the counter holder. Furthermore, a disk can be rotated in a particularly simple manner as a result of which the cutter and the counter holder can also be rotated in a particularly simple manner about the central axis and thus about the cable to be cut into.

A rotation of the disk can be particularly advantageously performed by way of a belt drive. An electric motor here can be coupled to the disk by way of a belt mechanism. A belt of the belt mechanism is preferably driven by an output shaft of the electric motor, and the belt is circumferentially tensioned about the disk in order for the latter to be driven, as a result of which a particularly suitable gearing ratio can also be implemented.

Driving the rotary head by a belt mechanism is possible without any complex construction being required; sliding electrical contacts and the like can in particular be dispensed with.

According to a refinement of the invention it can be provided that the cutter is configured as a shaped cutter or as a circular cutter.

The shape of the cutter, for example in the cutting region, or on the cutter blade thereof, respectively, can have a round or elliptic profile so as to at least approximately follow the contour of the cable or the cable component, respectively. In principle however, a rectilinear cutting-edge/blade, or a straight cutter, respectively, can also be provided.

A circular cutter which has a completely round blade can also be provided. The blade can be mounted so as to be freely rotatable on the cutter so as to be able to roll on the cable (in principle however, a non-rotatable blade or a driven blade can also be provided). A freely rotatable circular cutter can in particular cut into the cable component in a particularly advantageous and controlled manner while the rotary head rotates about the cable. A cable component of silicone, for example a cable sheath configured from silicone, can in particular be cut into in a particularly advantageous manner by a circular cutter.

According to a refinement of the invention it can be provided that the counter holder configures a bearing face which is adapted to the external diameter of the cable component and/or configures a conically tapering bearing face.

The bearing face of the counter holder can have a pure V-shape or any arbitrary tapering shape into which a cable can be placed, preferably in the manner of a two-point mounting. A tapering bearing face is particularly suitable for holding cables with different cable diameters.

The counter holder can preferably be releasably connected to the rotary head, as a result of which the device can be rapidly and easily adapted to the most varied types of cables and/or cable diameters. The cutter can also be replaceable in a modular manner.

The counter holder can have a slot into which the cutter can penetrate. As a result, the device can be usable for different cable types, in particular with different cable diameters.

It can also be provided that the bearing face of the counter holder is formed by rollers or by an anti-friction face. The use of rollers or an anti-friction face can be advantageous because the friction of the cable, in particular during the rotation of the counter holder about the cable, is kept low as a result.

It can be provided, for example, that the counter holder for configuring the bearing face has at least four rollers, wherein the rollers are disposed on two axles that run so as to be mutually parallel, and wherein at least two rollers are in each case disposed on the same axle, wherein two rollers disposed on the same axle have a mutual axial spacing so as to configure the slot for the penetration of the cutter.

The axles for the rollers preferably run in the axial direction, or the advancing direction, respectively, of the cable.

In order to be able to strip a multiplicity of different types of cables and cable diameters, it can be advantageous for the cutter to be able to penetrate into the counter holder at different depths. When rollers are used, a design embodiment having four rollers can be advantageous because a corresponding slot can in each case be configured between two rollers in a technically simple manner. Alternatively, it can of course also be provided that only two rollers are disposed on two axles that run so as to be mutually parallel, wherein the rollers have one or a plurality of slots.

It can also be provided that the counter holder has replaceable rollers. When using a counter holder which has a technically simple possibility for replacing rollers, the device can be simply adjusted to different types of cables and/or cable diameters.

In a refinement of the invention it can be provided that the counter holder in the direction of the central axis is able to be actuated onto the cable.

As a result of the counter holder, apart from the cutter, also being radially displaceable in the direction of the central axis, the cable can be even better positioned and fixed during the processing. The cut into the cable can thus take place in an even more exact manner. As a result, it is advantageously and potentially not necessary for additional guiding and/or complex centering to be provided for the cable in order for the latter to be aligned prior to the incision. In principle however, separate guiding and/or separate fixing can also be provided for the cable irrespective of whether or not the counter holder is able to be actuated.

It can be provided that the counter holder during the conveying or the advancing movement, respectively, of the cable by the transport installation (or the operator) is at a radial distance from the central axis such that the cable does not contact the counter holder during conveying.

A corresponding offset of the counter holder from the central axis during the conveying of the cable can be advantageous because friction between the cable and the counter holder is avoided as a result.

It can however also be provided that the counter holder during conveying of the cable by the transport installation (or the operator) bears on the cable and positions the latter preferably so as to be coaxial with the central axis of the rotary head. The counter holder can thus be usable for guiding the cable.

A stationary positioning of the counter holder, at least during the operation of the device, can be advantageous because no means, or only simple means, are required in this instance for adjusting the counter holder in order for the latter to be uniquely positioned for the stripping procedure of a cable type.

It can be provided that the counter holder, prior to the start of the stripping procedure, in particular for a new cable, is initially mechanically positioned. For the initial calibration of the device for different cable types and/or cable diameters a mechanical adjustment by hand can also be provided in a simple design embodiment.

It can however also be provided that the counter holder is disposed so as to be fundamentally immovable on the rotary head.

In a refinement of the invention it can be provided that the counter holder configures a detent for the cutter, or that the cutter configures a detent for the cable, so as to delimit the maximum depth of the radial incision in the cable component.

A detent of the counter holder can be an advantageous possibility for avoiding damage, for example scoring, of another component of the cable that is situated below the cable component. The cutter, or part of the cutting edge/blade of the cutter, or any other part of the cutter, can thus advantageously impact the counter holder, or a region of the counter holder, respectively, even before the cutter has completely cut through the portion. The detent of the counter holder can optionally also be adjustable. For example, the detent can be adjusted by means of a grub screw, or be configured as a grub screw.

It can however also be provided that the cutter per se configures or has a detent for delimiting the cutting depth. The detent can be configured from a plastics material, for example, or from a metal, for example aluminum.

In the case of a linear cutter having a straight blade, or of a shape cutter having a shape of the blade that is at least partially adapted to the cable component to be cut, it can be provided for the front cutting region of the blade to be clamped at a defined spacing from a cutter receptacle. A delimitation of the cutting depth for a circular cutter can be implemented in a similar manner in that a cylindrical detent having a smaller radius than the blade is disposed so as to be coaxially adjacent to the blade, for example.

In an advantageous refinement of the invention it can be provided that a respective gate guide installation and/or a respective rail system are/is provided for actuating the cutter, the counter holder and/or the at least one pull-off tool onto the cable.

The use of a gate guide installation represents a technically reliable measure for transmitting mechanical movements.

It can be provided that a first gate guide installation has a gate guide having a guide path and a transmission member so as to convert a movement of the gate guide into a radial movement of the cutter.

It can also be provided that a second gate guide installation has a gate guide having a guide path and a transmission member so as to convert a movement of the gate guide into a radial movement of the counter holder.

It can moreover be provided that a third gate guide installation has a gate guide having a guide path and a transmission member so as to convert a movement of the gate guide into a radial movement of the pull-off tool. In the case of a plurality of pull-off tools, corresponding further gate guide installations can be provided. A conjoined activation of the pull-off tools by way of a common gate guide installation can also be provided.

It can furthermore be provided that the gate guide of the first gate guide installation is configured for carrying out an axial movement in and counter to the advancing direction, wherein the transmission member has a gate guide block, and wherein the gate guide block is positively guided in the guide path of the gate guide, and wherein the transmission member is established on the cutter, and the cutter by way of a linear guide is connected to the rotary head.

In an analogous manner, it can be provided that the gate guide of the second gate guide installation is configured for carrying out an axial movement in and counter to the advancing direction, wherein the transmission member has a gate guide block, and wherein the gate guide block is positively guided in the guide path of the gate guide, and wherein the transmission member is established on the counter holder, and the counter holder by way of a linear guide is connected to the rotary head.

Analogous embodiments can be provided for the third gate guide installation, or for further gate guide installations, respectively, which are used for activating the at least one pull-off tool.

The radial feeding of the cutter, the counter holder and/or the at least one pull-off tool represents a particular challenge. The cutter and the counter holder rotate about the central axis of the rotary head so as to cut into the cable and herein to hold the latter in a corresponding manner. This could mean that at least the actuator mechanism for moving the cutter, or the counter holder, respectively, radially toward the central axis has to conjointly rotate. However, disposing the actuator mechanism on the rotary head increases the weight of the latter. Moreover, in order to be able to guarantee short cycle times, the cutter in particular has to be moved rapidly in a radial manner. This also represents a problem when the actuator mechanism has to conjointly rotate in order for the cutter installation to be moved. An even greater challenge lies in supplying the actuator mechanism with power when said actuator mechanism conjointly rotates on the rotary head. This can take place, for example, by way of sliding contacts which however may lead to a correspondingly high susceptibility to defects.

The design embodiment of the gate guide in such a manner that the latter carries out an axial movement in and counter to the advancing direction, wherein this movement by way of a transmission member and further elements then is converted into a radial movement of the cutter and optionally also of the counter holder, represents a particularly advantageous solution here. An actuator mechanism, for example an electric motor, which is fastened to the rotary head is thus not absolutely necessary.

The gate guide, when correspondingly coupled, can preferably conjointly rotate with the rotary head. The coupling elements here can be designed in such a manner that the gate guide is axially displaceable in the direction toward the rotary head, or in the opposite direction, respectively, such that a radial movement of the cutter as a result of a corresponding axial displacement of the gate guide can be initiated by way of the further parts of the gate guide installation.

A displacement of the gate guide in the axial direction, despite the guide being coupled for rotation with the rotary head, that is to say that the gate guide and the rotary head rotate at the same rotating speed, can be achieved using known technical measures.

Devices for stripping cables in the advancing direction, thus in the longitudinal direction, of the cable typically are not subject to any substantial restrictions in terms of construction. Accordingly, the device can have a suitable length so that a movement of the gate guide in the advancing direction can be generated, and said movement can subsequently be geared or converted, respectively, to a radial direction.

It can be provided that the gate guide by means of an activation element of an actuator is able to be moved in and counter to the advancing direction. Such an activation element can be, for example, the translator of a linear motor. The actuator is preferably an electric motor, for example a stepper motor.

The activation element, for example in a design embodiment as a spindle, here can be connected to a receptacle or a frame, within which the gate guide is rotatably mounted, in such a manner that the receptacle is moved in and counter to the advancing direction, that is to say in the axial direction, when the spindle rotates. A design embodiment of the receptacle in such a manner that the latter interacts with the spindle in the desired manner is known in the prior art. A correspondingly suitable bore, or a thread, or a spindle receptacle, respectively, can be provided in the receptacle, for example.

The receptacle can be designed in such a manner that the gate guide is held so as to be axially immovable in the receptacle such that the gate guide moves conjointly with the receptacle when the receptacle is axially displaced.

A dedicated electric motor, or a dedicated activation element, preferably a spindle, is preferably in each case provided for the gate guide of the cutter, the gate guide of the counter holder and/or the gate guide(s) of the at least one pull-off tool, so that the gate guides are able to be moved in a mutually independent manner. This can be advantageous because a movement of the counter holder is potentially less frequently required, for example, in particular when it is provided that the counter holder is no longer to be moved during the stripping procedure once said counter holder has been adjusted to one type of cable, or one cable type, respectively. A gate guide can optionally also be entirely dispensed with in this case. A mechanical adjustment of the counter holder by hand can be sufficient here, in particular when the adjustment is infrequent.

By way of the described construction, in particular the configuration of the actuator, preferably as an electric motor having a belt drive and a spindle, the gate guide can be relocated in a rapid, reliable and exact manner in the axial direction, and the cutter, the counter holder and/or the at least one pull-off tool thus be radially actuated.

It can also be advantageous for the counter holder, the cutter and/or the at least one pull-off tool to be operated directly by way of actuators, wherein the actuators can be fastened to the rotary head. This can be advantageous for specific applications.

Furthermore, a rail guide for the cutter, the counter holder and/or the at least one pull-off tool can be advantageous.

In a refinement of the invention it can be provided that the pull-off tool is configured as a shaped tool which is adapted to an internal diameter of the cable component. The pull-off tool can however also be configured so as to be linear or straight, respectively.

The pull-off tool can in principle be configured in a manner similar to that of the cutter or a shape cutter, respectively, but in contrast to the shape cutter or cutter, respectively, have a thicker cutting-edge/blade.

It is not envisaged that cutting into the cable component takes place by means of the pull-off tool. The pull-off tool is intended to serve only for plunging into the incision that has already been generated by the cutter and to thus generate a corresponding form-fit with the cable component so as to be able to subsequently pull off the portion, or else optionally be able to subsequently tear off/sever said portion.

In an advantageous refinement of the invention two pull-off tools can be provided, wherein a first pull-off tool is disposed so as to be opposite a second pull-off tool, and wherein the pull-off tools are aligned toward the central axis.

The pull-off tools are preferably disposed on a radial line, or on a straight line, respectively, which extends through the central axis of the rotary head. In the event of a linear movement of the two pull-off tools, said two pull-off tools can consequently directly converge or diverge.

The alignment of the two pull-off tools is preferably rotated by 90 degrees in relation to the disposal of the cutter and the counter holder on the rotary head. As a result, the space on the rotary head can be utilized in an ideally optimal manner. In principle however, it can also be provided that the pull-off tools are offset from the alignment of the cutter and the counter holder by an angle that deviates from 90 degrees.

It can be provided that a cleaning process is performed after the stripping procedure, according to which particles adhering to the cable end are removed.

Inter alia metallic particles, non-metallic particles, fibers (in particular plastics-material fibers), pieces of film/foil (of a metallic foil, of a non-metallic film, or of a composite film) and dust particles can be considered to be particles. A pulverulent mineral, for example talc, can also be treated as a particle in the context of the invention. In particular, particles or fibers of metal shavings, resins, plastics materials, minerals or dust can be advantageously removed.

The technical cleanliness in the context of the fabrication of an electric cable, in particular in the context of an automated or fully automated fabrication of an electric cable, can thus be advantageously established in that a corresponding cleaning process is performed after the stripping.

The removal of the particles can be particularly advantageously provided prior to the application of components of a later plug connector in the context of the system for fabricating the cable, said system still to be described hereunder.

The cleaning process can in principle be implemented or carried out, respectively, in different ways, some particularly advantageous ways being listed hereunder. Arbitrary combinations of the variants hereunder, but potentially also individual solutions, are suitable.

It can be provided that the cleaning process comprises blowing off the particles. It can in particular be provided that the electric cable is introduced into an annular nozzle by way of which the particles are blown off by means of the annular nozzle. A nozzle used in the context of the invention can optionally be configured for utilizing the so-called Venturi effect (Venturi nozzle). By increasing the flow velocity of the compressed air used in a targeted manner, in particular by a tapered location in a tube, the adjacent ambient air in the case of an adjacent access to the ambient air can be suctioned and the overall quantity of air supplied can be increased as a result. A Venturi nozzle can reduce the requirement in terms of compressed air.

It can also be provided that the particles are blown off in a targeted manner toward a collection container, a filter unit and/or a suction installation in order for the blown-off particles to be trapped.

It can moreover be provided that the cleaning process comprises a compressed-air jet process, in particular a dried-ice jet process or a $CO_2$ jet process.

It can in particular also be provided that the cleaning process comprises suctioning of the particles. A round nozzle, a flat-jet nozzle or any other nozzle can be provided for suctioning.

It can furthermore be provided that an air flow generated in the context of the cleaning process is impulse-controlled. A pulsed air jet can in particular achieve a high cleaning effect in the field of application according to the invention. An impulse-controlled air flow can be suitable for blowing off and/or suctioning the particles, for example.

It can finally also be provided that the cable end during the cleaning process is supplied with ionized air in order for the electrostatic attraction of the particles to be minimized. The targeted reduction of the electrostatic effect can be advantageous in particular for removing particles from a plastics material, said particles being created by the stripping of the cable sheath, an insulation or a dielectric, for example.

The cleaning process can also comprise brushing and/or wiping off the particles. An adhesive method can also be provided for the particles, according to which the particles are removed by means of a film or an adhesive strip.

It can moreover be provided that the cable end during the cleaning process is exposed to defined vibrations in order for the particles to be loosened.

The invention also relates to a method for stripping a cable, according to which method the cable is introduced along a central axis into a stripping installation in which a rotary head rotates about the central axis, a cutter and a counter holder for the cable being disposed opposite one another and so as to be aligned toward the central axis on said rotary head. The cutter in the direction toward the central axis is actuated onto the cable so as to at a defined axial position generate a radial incision in a cable component of the cable. According to the invention, it is provided for the method that at least one pull-off tool disposed in the direction toward the central axis on the rotary head is actuated onto the cable so as to engage in the incision generated by the cutter, whereupon a portion of the cable component is at least partially pulled off from the cable by the pull-off tool.

According to a particularly preferred refinement of the invention it can be provided that the at least one pull-off tool engages in the incision generated by the cutter without the cable being repositioned in the axial direction.

The electric cable can be configured as a high-voltage line, for example.

It can be provided that the method described hereunder is carried out while using the device already described.

In a refinement it can be provided that the portion is not completely severed as a result of the radial incision.

It can in principle be provided that the cutter radially does not cut completely through the cable component so as not to damage the underlying components of the cable. According to the invention it may be sufficient for only a predetermined breaking point, for example an encircling groove, to be generated and for the portion to be subsequently "torn off" by means of the at least one pull-off tool.

In a refinement of the invention it can be provided that the rotary head rotates while the cutter generates the incision, so as to generate a radially encircling incision.

A radially encircling incision is in particular to be understood such that the cable component is cut into in an encircling manner such that an annular portion of the cable component, or the portion, respectively, can subsequently be pulled off from the cable in the longitudinal direction.

It can in principle be provided that the rotary head continuously rotates during the entire method. It can however also be provided that the rotary head rotates only once the cutter is positioned for cutting into the cable.

It can be provided that the cutter is rotated about the cable at least by one complete revolution so as to generate a completely encircling incision. In order for the result to be further improved it can however also be provided that the cutter is rotated about the cable by more than 360 degrees. At the same time, the cutter can optionally also be radially actuated ever further, or be continuously radially actuated during the rotation of the rotary head, respectively.

A partially encircling incision can however also be provided, wherein one or a plurality of webs can remain between the individual partially annular incisions, for example.

According to a refinement of the invention it can be provided that the rotary head is stationary while the portion is pulled off by the pull-off tool.

In principle however, it can also be provided that the rotary head rotates (continues to rotate) while the portion is pulled off by the at least one pull-off tool. The rotation of the rotary head while pulling off is however not necessary and may potentially also lead to the at least one pull-off tool "tilting" in the at least one pull-off tool, undesirable forces and vibrations thus being applied to the device and/or the cable. For this reason it is typically provided that the rotary head is stationary during the pulling off.

In an advantageous refinement of the invention it can be provided that the cable is actuated by a transport installation in a linear manner along the central axis into the stripping installation prior to the incision being generated. Alternatively or additionally it can also be provided that the cable is actuated by an operator in a linear manner along the central axis into the stripping installation prior to the incision being generated.

The rotary head can have a central bore through which the cable can advantageously be guided. As a result, the length of the portion can be more flexibly adjustable because the front end of the cable in this instance can plunge through the bore. Furthermore, the cutter, the counter holder as well as the at least one pull-off tool in this instance can be fastened axially closer to the rotary head, this potentially further minimizing the susceptibility of the device to tolerances.

In an advantageous refinement of the invention it can be provided that the cable, upon the actuation of the at least one pull-off tool, counter to an advancing direction along the central axis, is at least partially extracted from the stripping installation again in order for the portion to be at least partially pulled off from the cable (partial pulling off) or completely pulled off from the cable (complete pulling off).

The transport installation for feeding the cable for the stripping can thus advantageously also be used for pulling off the portion once the at least one pull-off tool has been actuated into the incision, or engages in the incision, respectively. Alternatively or additionally, an operator can move the cable in a corresponding manner in order for the portion to be pulled off.

The invention also relates to a computer program product having program code means for carrying out a method according to the preceding and following embodiments when the program is executed on a control installation of a device for stripping a cable (in particular on a device according to the preceding and following embodiments).

The control installation can be configured as a microprocessor. Instead of a microprocessor any arbitrary further installation can also be provided for implementing the control installation, for example one or a plurality of arrays of discrete electrical components on a printed circuit board, a programmable logic controller (PLC), an application-specific integrated circuit (ASIC), or any other programmable circuit, for example also a field programmable gate array (FPGA), a programmable logic array (PLA) and/or a commercially available computer.

The invention furthermore relates to a rotary head for a device for stripping a cable, as described above and hereunder.

In the context of the inventive overall concept, the invention moreover relates to a system for fabricating an electric cable, in particular a high-voltage line. The system for fabricating as a superordinate unit relates to the device and the method for stripping, wherein the stripping according to the invention is typically required for the fabrication.

The system comprises a device for stripping a cable, according to the preceding and following embodiments, as well as at least one module which for fabricating the electric cable is independent of the device.

The distribution of the processing steps according to the invention among a plurality of mutually independent modules enables the system to be operated as a "production line process" or as a "cycled automatic unit" with successive individual steps, respectively, in order for the processing time to be reduced in the case of mass processing.

Furthermore, the device, or the individual modules, respectively, can be of modular construction as a result of which individual modules of the structural group can be replaced, modified or removed without great complexity. As a result, the system can be able to be configured using simple means, in particular for the processing of different types of cables.

The independent modules can be disposed preferably upstream or downstream of the device.

It can be provided that the cable for the processing by the system according to the invention is fastened to a cable carrier. The cable carrier can be part of a workpiece carrier system. The cable carrier by means of a workpiece conveyor (for example a transport belt/conveyor belt) can transport the cable between the individual modules of the system along the production line. However, instead of a workpiece conveyor, the cable carrier can also be transported between the individual modules by an operator, for example with the aid of a roller track. It can also be provided that the cable carrier (or else the cable without the support) is transported between individual modules by means of a gripper.

In principle, a plurality of cable carriers which are in each case assigned to different modules can also be provided. For example, a first cable carrier can transport the cable between modules of a first group of modules, and a second cable carrier can transport the cable between modules of a second group of modules. Even more cable carriers and assigned modules can also be provided, wherein even one single, immovable cable carrier per module is possible. It can also be provided that the cable carrier is immovably assigned to one or a plurality of modules, for example a group of modules, wherein in this instance optionally a tool carrier system successively actuates the tools of the individual modules (or the individual modules) onto the cable. The cable, preferably in a known or unchanged alignment or orientation, respectively, can be transferred between the individual cable carriers by means of a gripper installation, for example, or any other transport installation.

The cable carrier can have one or a plurality of fixing means for axially and/or radially fixing the cable. At least one of the two cable ends is preferably fixed on the cable carrier. The cable, or the cable end, respectively, is preferably fixed on the cable carrier in such a manner that said cable or cable end, respectively, can be processed directly by the modules once the cable carrier has fed the cable or the cable end, respectively, to the module. It can optionally be provided that the cable carrier introduces the cable end to be processed into the module, in particular orthogonally to the conveying direction of the workpiece conveyor.

Depending on the overall length of the cable it can be provided that both cable ends are fixed on the cable carrier, wherein the cable can preferably be fastened to the cable carrier in such a manner that said cable between the cable ends thereof configures a U-shaped or helically wound profile.

The cable carrier is preferably assigned to the cable during the entire fabrication. It can however also be provided that the cable carrier is assigned to the cable only during part of the fabrication and the cable, upon processing by a first group of modules, for further fabricating, or for processing, respectively, by a second group of modules is first passed on to a further cable carrier, or assigned to another cable carrier, respectively.

In an advantageous refinement of the invention it can be provided that at least one of the independent modules is configured as a module for aligning and orienting the electric cable, and/or as a module for equipping the cable sheath with plug connector components, and/or as a module for removing a cable film from a front end of the cable, and/or as a module for assembling a support sleeve on the front end of the cable, and/or as a module for processing a braided cable shield of the cable, and/or as a module for assembling a housing component of an electric plug connector, and/or as a module for cleaning particles from the front end of the cable.

It can furthermore be provided that a module configured as a length-trimming installation in the advancing direction of the cable is disposed after the rotary head.

As a result of the system possessing a length-trimming installation which in the advancing direction of the cable is disposed after the rotary head, advantageous processing of the cable, in particular stripping combined with defined length-trimming, can be achieved.

Further modules which are mutually independent and independent of the device can also be provided, said modules being disposed upstream or downstream of the device.

The invention also relates to an electric cable processed by a method according to the preceding and following embodiments.

The invention moreover relates to an electric cable which has been processed by a device and/or a system according to the preceding and following embodiments.

Features which have been described in the context of the method according to the invention can of course also be advantageously implemented for the device according to the invention, the computer program product according to the invention, the rotary head according to the invention and the system according to the invention, and vice versa. Furthermore, advantages which have already been mentioned in the context of the method according to the invention can also be understood to relate to the device according to the invention, the computer program product according to the invention, the rotary head according to the invention or the system according to the invention, and vice versa.

It is additionally to be pointed out that terms such as "comprising", "having" or "with" do not exclude any other features or steps. Furthermore, terms such as "a" or "the" which indicate a singularity of steps or features do not exclude a plurality of features or steps, and vice versa.

It is furthermore emphasized that the values and parameters described in the present case also encompass deviations or fluctuations of +10% or less, preferably +5% or less, more preferably +1% or less, and very particularly preferably +0.1% or less, of the respectively stated value or parameter, if such deviations are not ruled out in practice in the implementation of the invention. The specification of ranges by way of start and end values also encompasses all those values and fractions encompassed by the respectively stated range, in particular the start and end values and a respective mean value.

Exemplary embodiments of the invention will be described in more detail hereunder by means of the drawing.

BRIEF DESCRIPTION OF DRAWINGS

The figures each show preferred exemplary embodiments in which individual features of the present invention are illustrated in combination with one another. Features of one exemplary embodiment may also be implemented separately from the other features of the same exemplary embodiment, and may accordingly be readily combined by an expert to form further useful combinations and sub-combinations with features of other exemplary embodiments.

In the figures, functionally identical elements are provided with the same reference signs.

In the schematic figures.

DETAILED DESCRIPTION OF THE INVENTION

Figure 1:
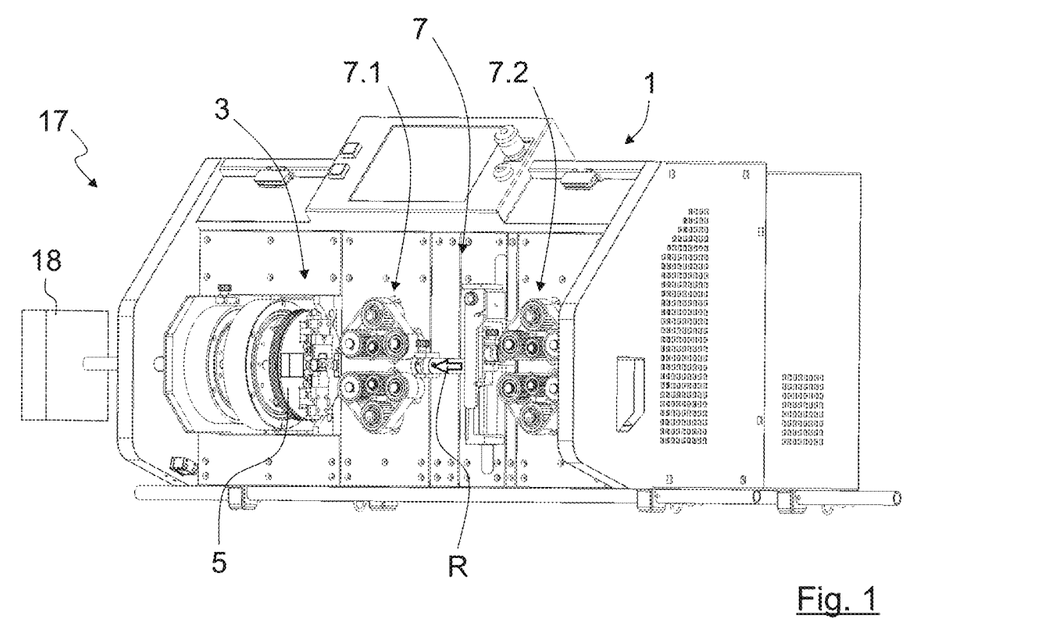
FIG. 1 shows a device according to the invention in a perspective view.
Figure 3:
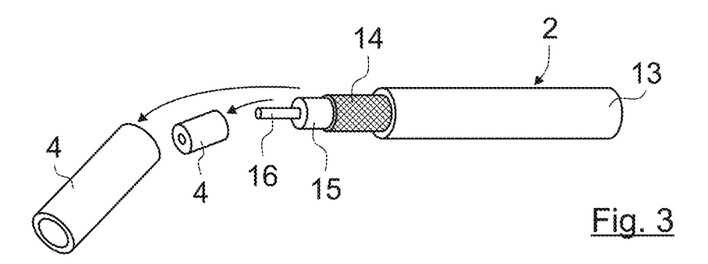
FIG. 3 shows an exemplary single-core electric cable having two portions which are to be stripped according to the invention.
Figure 5:
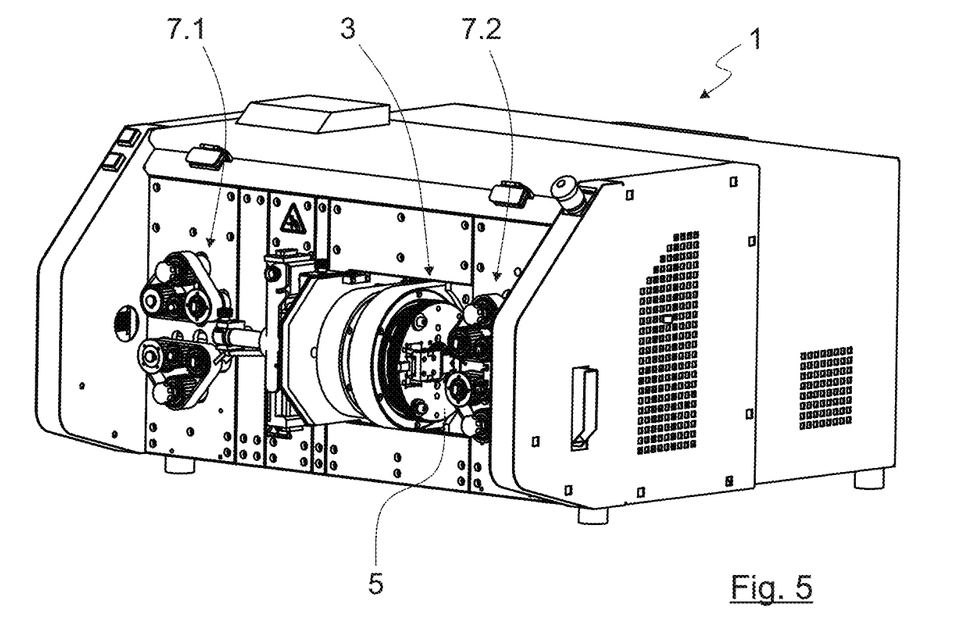
FIG. 5 shows a device according to the invention and according to a preferred embodiment in a perspective view.

FIG. 1 shows an exemplary device 1 according to the invention for stripping a cable 2, for example a coaxial cable shown in FIG. 3. The cable 2 to be processed is preferably a so-called continuous cable. FIG. 1 furthermore shows a stripping installation 3 for cutting into and pulling off a portion 4 of a cable component 13, 14, 15. FIG. 5 shows a device 1 according to a further preferred exemplary embodiment. By virtue of the similarities of the two exemplary embodiments, the latter are conjointly described hereunder.

Figure 2:
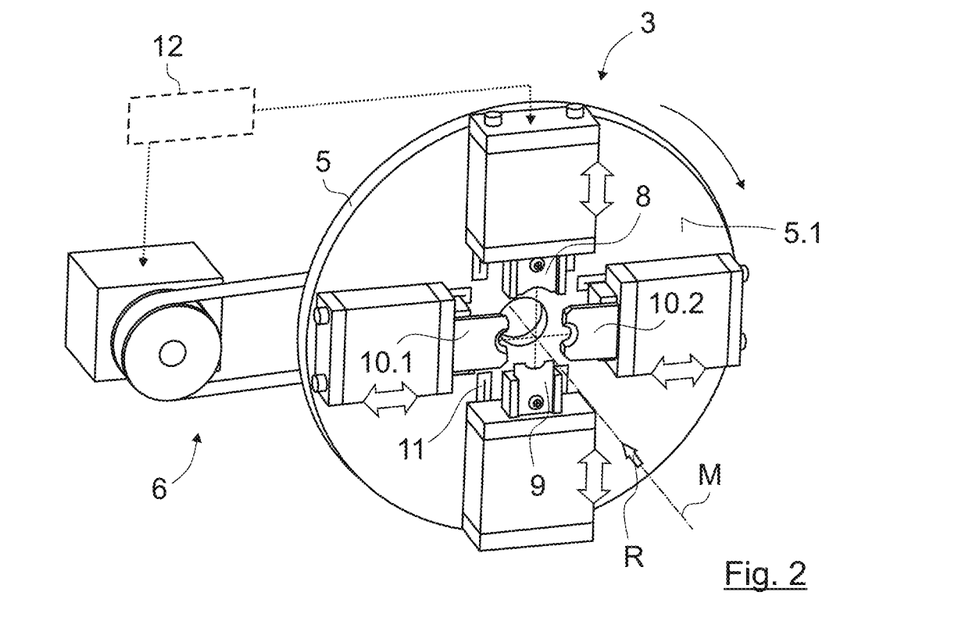
FIG. 2 shows the rotary head of the device according to FIG. 1 in a perspective view.

The stripping installation 3 has a rotary head 5 which is rotatable about a central axis M and which for clarification is illustrated so as to be enlarged in fragments in FIG. 2. The rotary head 5 is configured as a disk, wherein a belt drive 6 is provided for rotating the rotary head 5 (cf. FIG. 2).

In order for the cable 2 to be introduced along the central axis M into the stripping installation 3, the exemplary device 1 illustrated in each case in FIG. 1 and FIG. 5 has a transport installation 7 for conveying the cable 2 in a linear manner along an advancing direction R. The transport installation 7 is composed of two transport units 7.1, 7.2 which are separated in the advancing direction R. Additionally, one or a plurality of further transport units can also be positioned in the advancing direction R in front of the rotary head 5 so as to push the cable 2 forward. The rotary head 5 can be disposed behind the transport units 7.1, 7.2, as is illustrated in FIG. 1, in particular when the cable 2 has already been previously trimmed to length and for stripping a cable component 13, 14, 15 is fed to the rotary head 5 by way of the end of said cable 2 to be processed. However, the rotary head 5 can preferably be disposed between the transport units 7.1, 7.2, as is illustrated in FIG. 5. The cable 2 in this instance can advantageously first be trimmed to length and subsequently stripped.

Alternatively or additionally to the transport installation 7, it can also be provided that an operator moves the cable 2 in a corresponding manner.

Figure 6:
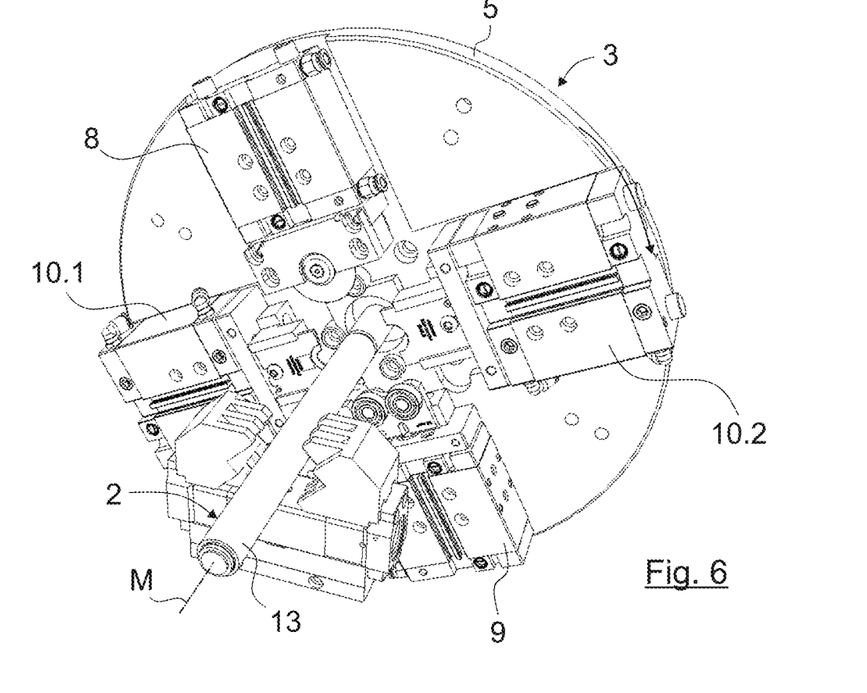
FIG. 6 shows a rotary head having a circular cutter and a counter holder having a bearing face formed by rollers.

A cutter 8 and a counter holder 9 for the cable 2 are disposed on the rotary head 5 so as to be mutually opposite and aligned toward the central axis M (cf. in particular FIG. 2 and FIG. 6). The cutter 8 in the direction toward the central axis M is able to be actuated onto the cable 2 so as to at a defined axial position generate a radial incision in the cable component 13, 14, 15 of the cable 2. The rotary head 5 in FIG. 5 is illustrated only in a simplified manner, according to which only the cutter 8 is shown so as to be assembled on the rotary head 5.

Figure 7:
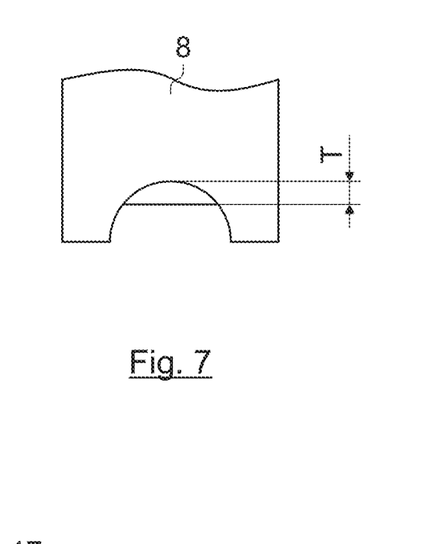
FIG. 7 shows a linear cutter having a straight cutting edge and a detent for the cable.

In the exemplary embodiment according to FIG. 2 the cutter 8 is configured as a shaped cutter. In principle however, the cutter 8 can have an arbitrary cutting edge. For example, the cutter 8 can also have a linear construction, or a straight cutting edge, respectively, as is illustrated in FIG. 7. Furthermore, a circular cutter 8' can be provided (cf. FIG. 8). The circular cutter 8' can in particular be without a drive and be mounted so as to be freely rotatable in order to be able to roll on the cable 2 while rotating about the cable 2.

The counter holder 9 configures a bearing face which is adapted to the external diameter of the cable component 13, 14, 15. In principle, the counter holder 9 can configure an arbitrary bearing face, in particular a tapered bearing face, for example a V-shaped bearing face or a bearing face formed by rollers (cf. counter holder 9 of FIG. 6). The counter holder 9 in the exemplary embodiment, in the direction toward the central axis M is likewise able to be actuated onto the cable 2. In principle however, the counter holder 9 can also be disposed so as to be immovable on the rotary head 5.

Figure 8:
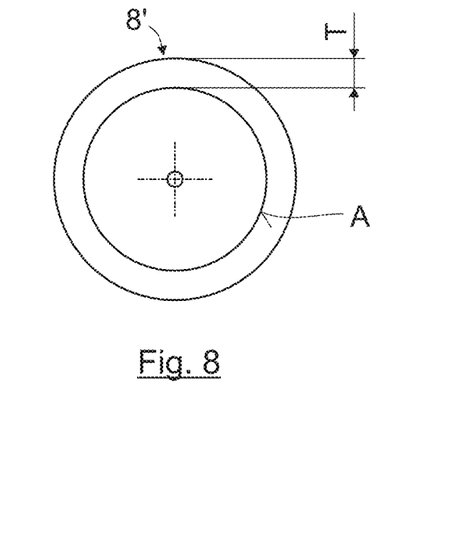
FIG. 8 shows a circular cutter having a detent for the cable.

In order for a cutting depth delimitation to be configured the counter holder 9 can be configured in such a manner that the latter configures a detent for the cutter 8, 8'. The maximum depth T of the radial incision in the cable component 13, 14, 15 can be delimited as a result, and damage to further components of the cable 2 that are situated below the cable component 13, 14, 15 can be prevented. Alternatively or additionally, the cutter 8, 8' per se can also have or configure, respectively, a detent for the cable 2 in order for the cutting depth to be delimited. Illustrated in an exemplary manner in FIG. 8 is a linear cutter 8, wherein the cutting edge is assembled in a cutter receptacle in such a manner that the cutter receptacle, or the cutter 8, respectively, configures a detent which in a form-fitting manner predefines a maximum depth T for the incision. A circular cutter 8' can also have a detent, as is illustrated in an exemplary manner in FIG. 8. The circular cutter 8' according to FIG. 8 to this end has a cylindrical detent A, the radius of the latter being smaller than the radius of the cutting edge in order to predefine the maximum depth T for the incision.

In principle, it can be provided that the cutter 8 does not completely sever the cable component 13, 14, 15 or the portion 4, respectively, and leaves behind individual webs or a radial inner ring, for example. The portion 4, as a result of the radial incision, can thus optionally at first not be completely severed.

The rotary head 5 (cf. FIG. 2) preferably rotates while the cutter 8, 8' generates the incision, so as to generate an incision which in radial terms is completely encircling.

It is provided that the stripping installation 3 has at least one pull-off tool 10.1, 10.2 which is disposed on the rotary head 5 and in the direction of the central axis M able to be actuated onto the cable 2, wherein the at least one pull-off tool 10.1, 10.2 in relation to the cutter 8, 8' is positioned in such a manner that the at least one pull-off tool 10.1, 10.2 for pulling off the portion 4 of the cable component 13, 14, 15 engages in the incision generated by the cutter 8, 8' when the at least one pull-off tool 10.1, 10.2 is actuated onto the cable 2.

Two pull-off tools 10.1, 10.2 are preferably provided, as is illustrated in the exemplary embodiment. A first pull-off tool 10.1 and a second pull-off tool 10.2 here are disposed opposite one another and in each case aligned toward the central axis M. The two pull-off tools 10.1, 10.2 are particularly preferably disposed so as to be offset from the cutter 8, 8' and the counter holder 9 by 90 degrees. In principle however, the two pull-off tools 10.1, 10.2 can be disposed at any arbitrary angle in relation to the alignment of the cutter 8, 8' and the counter holder 9.

In a manner similar to that of the cutter 8, 8' the pull-off tools 10.1, 10.2 can also be configured as shaped tools, in particular so as to be adapted to the internal diameter of the cable component 13, 14, 15.

The pull-off tools 10.1, 10.2, the cutter 8, 8' and the counter holder 9 are disposed next to one another on the rotary head 5 and in each case spaced so as to be equidistant from an end side 5.1 of the rotary head 5 so as to in a radial actuation run in each case toward the same axial point on the central axis M, as is indicated by dashed lines in FIG. 2.

In order for the cutter 8, 8', the counter holder 9 and/or the at least one pull-off tool 10.1, 10.2 to be actuated onto the cable 2, a respective gate guide installation (not illustrated in more detail) can be provided. However, a rail system can also be provided. Corresponding rails 11 are indicated on the rotary head 5 in FIG. 2.

The rotary head 5 is preferably stationary while the portion 4 is pulled off by the at least one pull-off tool 10.1, 10.2. In order for the portion 4 to be pulled off, the cable 2, upon the actuation of the pull-off tools 10.1, 10.2, counter to the advancing direction R along the central axis M, can at least be partially extracted from the stripping installation 3 again in order for the portion 4 to be at least partially pulled off (partial pulling off) or completely pulled off (complete pulling off) from the cable 2.

A computer program product having program code means for executing a corresponding method for stripping the cable 2 on a control installation 12 of the device 1 can be provided. The control installation 12 is indicated in FIG. 2 and is in particular able to control the belt drive 6 for driving the rotary head 5 as well as the actuators for actuating the cutter 8, 8', the counter holder 9 and/or the pull-off tools 10.1, 10.2 when required.

In principle, the device 1 according to the invention can be able to be advantageously used for stripping arbitrary cable components 13, 14, 15 of arbitrary cable types. An exemplary electric cable 2 is shown in an embodiment as a coaxial cable in FIG. 3. The electric cable 2 has a cable sheath 13, a braided cable shield 14 running thereunder. Insulation 15, or a dielectric, respectively, which encases an inner conductor 16 is disposed below the braided cable shield 14. In principle, the cable 2 may also have further cable components, for example a cable film not illustrated in more detail. The invention is furthermore also suitable for stripping multi-core electric cables 2.

For example, the device 1, or the method for stripping, respectively, can advantageously be used for stripping a portion 4 of the cable sheath 13 of the cable 2 and/or a portion 4 of the insulation 15 of the cable 2. The invention can however also be used for stripping the braided cable shield 14, for example, or the cable film not illustrated.

Figure 4:
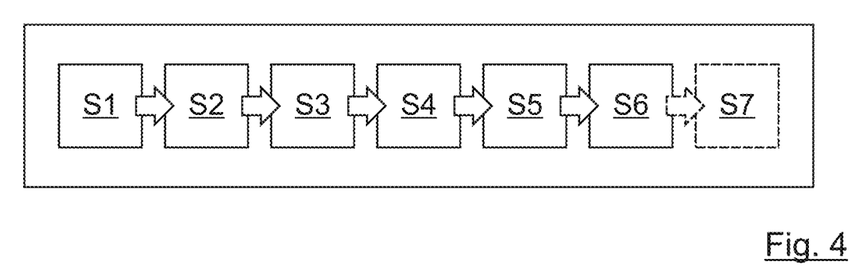
FIG. 4 shows a flow chart of a method according to the invention for stripping an electric cable.

A method for stripping an electric cable 2 is illustrated in an exemplary manner as a flow chart in FIG. 4.

In a first method step S1 it can be provided that the electrical cable 2 is actuated onto the stripping installation 3, as a result predefining the desired axial position of the incision in the cable component 13, 14, 15 to be stripped.

In a second method step S2 it can be provided that the cutter 8 is radially actuated onto the cable component 13, 14, 15. It can optionally be moreover provided that the counter holder 9 is also actuated.

In a third method step S3, which optionally can also be carried out before the second method step S2 or simultaneously with the second method step S2, the rotary head 5 can be set in rotation.

In a fourth method step S4 it can be provided that the cutter 8, 8' and/or the counter holder 9 is removed radially from the cable component 13, 14, 15 again once the cutter 8, 8' has generated a sufficiently deep incision in the cable component 13, 14, 15, for example after one or a plurality of revolutions of the rotary head 5. The at least one pull-off tool 10.1, 10.2 can simultaneously be actuated onto the cable component 13, 14, 15 in such a manner that said pull-off tool 10.1, 10.2 engages in the incision. The rotary head 5 can be stopped simultaneously or prior thereto. The pull-off tools 10.1, 10.2 are thus positioned in relation to the cutter 8, 8' in such a manner that said pull-off tools 10.1, 10.2 can engage in the incision without the cable 2 having to be repositioned in the axial direction, or the advancing direction R, respectively.

In a fifth method step S5 it can be provided that the cable 2, once the at least one pull-off tool 10.1, 10.2 has been brought to engage with the incision, counter to the advancing direction R is at least partially extracted from the stripping installation 3 again in order for the portion 4 to be at least partially pulled off from the cable 2.

Finally, in a sixth method step S6 it can be provided that the at least one pull-off tool 10.1, 10.2 is removed radially from the cable 2 again.

In an optional seventh method step S7 it can be provided that the cable 2, counter to the advancing direction R, is completely removed from the stripping installation 3.

Figure 9:
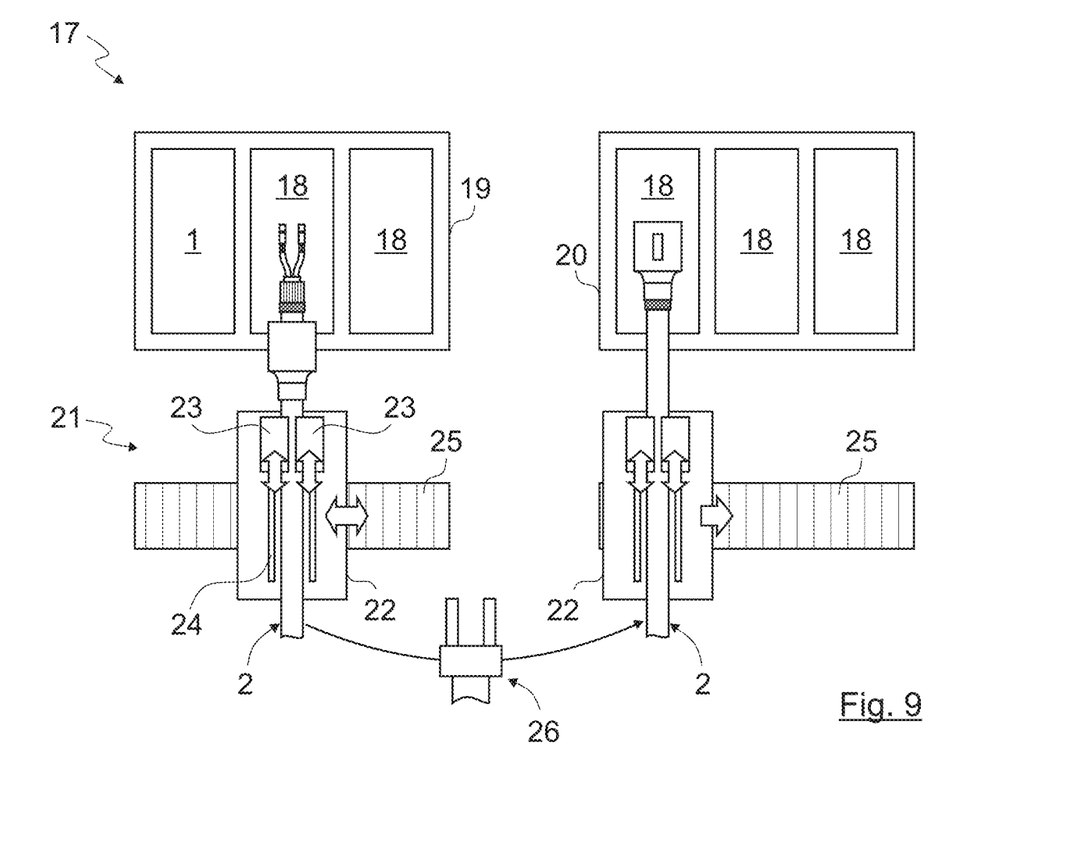
FIG. 9 shows a system for fabricating an electric cable having mutually independent modules.

The device 1 can be part of a system 17 for fabricating the electric cable 2. An exemplary system 17 is illustrated in FIG. 9. The system 17, apart from the device 1 for stripping, can preferably have at least one module 18 which for fabricating the electric cable 2 is independent from the device 1. An exemplary module 18 is also indicated by dashed lines as a black box in FIG. 1. A plurality of modules 18 are illustrated in FIG. 9, wherein the device 1, conjointly with two mutually independent modules 18, forms a first group 19 of modules 18, and with three further mutually independent modules 18, forms a second group 20 of modules 18.

In the context of the system, at least one of the independent modules 18 can be configured as a module for aligning and orienting the electric cable 2, and/or as a module for equipping the cable sheath 13 with plug connector components of a plug connector, and/or as a module for removing a cable film from a front end of the cable 2, and/or as a module for assembling a support sleeve on the front end of the cable 2, and/or as a module for processing a braided cable shield 14 of the cable 2, and/or as a module for assembling a housing component of an electric plug connector, and/or as a module for cleaning particles from the front end of the cable 2. In principle, arbitrary modules 18 can be provided for fabricating or processing, respectively, the cable 2 in the context of a cable fabrication.

A workpiece carrier system 21 for transporting a cable 2 to be processed between the device 1 and the modules 18, and optionally also feeding said cable 2 to the device 1, or to the modules 18, respectively, can be provided. Cable carriers 22 which for fastening the cable 2 have in each case clamping jaws 23 for holding the cable 2 in a defined alignment and/or orientation can be provided. The clamping jaws 23 can be configured so as to be displaceable, for example, in order for the cable 2 to be moved into the device 1 or into the modules 18 (indicated by a rail system 24 and corresponding double arrows in FIG. 9).

In order for the cable 2 for the processing thereof to be transported between the independent modules 18, the cable carriers 22 in an exemplary manner are in each case assembled on a transport installation in the manner of a conveyor belt 25. In principle, only one transport installation, or only one conveyor belt 25, respectively, may also be provided. A transport installation, or a conveyor belt 25, can also be entirely dispensed with, for example when the cable 2 is transported onward by an operator, or when a tool carrier system for successively actuating tools of the module 18, or the modules 18, onto the cable 2 is provided additionally or alternatively to the workpiece carrier system 21. A respective transport installation for feeding the cable 2 and/or the modules 18 (and/or the tools of the modules 18) conjointly to the processing is preferably provided for each group 19, 20 of modules 18. Moreover, a gripper installation 26 or any other transport system for transporting the cables 2 between the different groups 19, 20 of modules 18 (individually or between the cable carriers 22 assigned to the groups 19, 20, respectively, or else conjointly with the cable carrier 22) can be provided.

The invention claimed is:

1. A device for stripping a cable, the device comprising a stripping assembly configured to cut into and pull off a portion of a cable component of a cable,
    wherein the stripping assembly includes a rotary head which is rotatable about a central axis (M) and on which a cutter and a cable counter holder configured with a bearing face adapted to an external diameter of the cable are disposed opposite one another so as to be aligned toward the central axis (M),
    wherein the cable in the stripping assembly is guided along the central axis (M),
    wherein the cutter is configured to be actuated onto the cable in the direction of the central axis (M) so as to generate a radial incision in the cable component at a defined axial position,
    wherein the stripping assembly includes at least one pull-off tool which is disposed on the rotary head and in the direction of the central axis (M), the at least one pull-off tool configured to be actuated onto the cable, and
    wherein the pull-off tool is positioned in such a manner in relation to the cutter that the at least one pull-off tool engages in the incision generated by the cutter to pull off the portion of the cable component.

2. The device as claimed in claim 1,
    wherein the cutter and the at least one pull-off tool are disposed next to one another on the rotary head and spaced so as to be equidistant from an end side of the rotary head.

3. The device as claimed in claim 1,
    further comprising a transport assembly configured to convey the cable in a linear manner in an advancing direction (R) so as to actuate the cable along the central axis (M) into the stripping assembly.

4. The device as claimed in claim 1,
    wherein the rotary head has a disk shape, and
    wherein a belt drive is provided to rotate the rotary head.

5. The device as claimed in claim 1,
    wherein the cutter is configured as one of a shaped cutter and a circular cutter.

6. The device (1) as claimed in claim 1,
    wherein the cable counter holder is configured to be actuated onto the cable in the direction of the central axis (M).

7. The device as claimed claim 1,
    wherein, to delimit a maximum depth of the radial incision into the cable component, one of (i) the cable counter holder is designed to configure a detent for the cutter and (ii) the cutter is designed to configure a detent for the cable.

8. The device as claimed in claim 1,
further comprises at least one of (i) a respective gate guide assembly, and (ii) a respective rail system,
for actuating onto the cable at least one of (a) the cutter, (b) the cable counter holder, and (c) the at least one pull-off tool.

9. The device as claimed in claim 1,
wherein the at least one pull-off tool is configured as a shaped tool which is adapted to an internal diameter of the cable component.

10. The device as claimed in claim 1,
wherein the at least one pull-off toll comprises a first pool-off tool and a second pull-off tool, wherein a first pull-off tool lies opposite the second pull-off tool, and wherein the first and second pull-off tools are aligned toward the central axis (M).

11. The device as claimed in claim 1,
wherein the at least one pull-off tool is configured as a shaped tool which is adapted to an internal diameter of the cable component.

12. A system for fabricating an electric cable, the system comprising:
  a) a cable-stripping device comprising a stripping assembly configured to cut into and pull off a portion of a cable component,
  wherein the stripping assembly includes a rotary head which is rotatable about a central axis (M) and on which a cutter and a cable counter holder configured with a bearing face adapted to an external diameter of the cable are disposed opposite one another so as to be aligned toward the central axis (M),
  wherein the electric cable in the stripping assembly is guided along the central axis (M),
  wherein the cutter is configured to be actuated onto the electric cable in the direction of the central axis (M) so as to generate a radial incision in the cable component at a defined axial position,
  wherein the stripping assembly further includes at least one pull-off tool which is disposed on the rotary head and in the direction of the central axis (M), the at least one pull-off tool configured to be actuated onto the electric cable, and
  wherein the at least one pull-off tool is positioned in such a manner in relation to the cutter that the at least one pull-off tool engages in the incision generated by the cutter to pull off the portion of the cable component; and
  b) at least one cable-fabricating device that fabricates the electric cable independent of the cable-striping device.

13. The system as claimed in claim 12,
wherein the at least one cable-fabricating device is configured as at least one of
  (i) a cable alignment-and-orientation structure configured to align and orient the electric cable,
  (ii) a cable sheath-equipping structure comprising a component of an electric plug connector,
  (iii) a film-removal structure configured to remove a cable film from a front end of the electric cable,
  (iv) a sleeve-assembly structure configured to assemble a support sleeve on the front end of the electric cable,
  (v) a shield-processing structure configured to process a braided cable shield of the electric cable,
  (vi) a housing-assembly structure configure to assemble a housing component of the electric plug connector, and
  (vii) a cleaning element configured to clean a set of particles from the front end of the electric cable.

14. A device for stripping a cable, the device comprising a stripping assembly configured to cut into and pull off a portion of a cable component of a cable,
  wherein the stripping assembly includes a rotary head which is rotatable about a central axis (M) and on which a cutter and a cable counter holder are disposed opposite one another so as to be aligned toward the central axis (M),
  wherein the cable in the stripping assembly is guided along the central axis (M),
  wherein the cutter is configured to be actuated onto the cable in the direction of the central axis (M) so as to generate a radial incision in the cable component at a defined axial position,
  wherein the stripping assembly includes at least one pull-off tool which is disposed on the rotary head and in the direction of the central axis (M), the at least one pull-off tool configured to be actuated onto the cable,
  wherein the cutter and the at least one pull-off tool are disposed next to one another on the rotary head and spaced so as to be equidistant from an end side of the rotary head, and
  wherein the pull-off tool is positioned in such a manner in relation to the cutter that the at least one pull-off tool engages in the incision generated by the cutter to pull off the portion of the cable component.

15. The device as claimed in claim 14, further comprising a transport assembly configured to convey the cable in a linear manner in an advancing direction (R) so as to actuate the cable along the central axis (M) into the stripping assembly.

16. The device as claimed in claim 14,
wherein the rotary head has a disk shape, and
wherein a belt drive is provided to rotate the rotary head.

17. The device as claimed in claim 14,
wherein the cutter is configured as one of a shaped cutter and a circular cutter.

18. The device as claimed in claim 14,
wherein the cable counter holder is configured to be actuated onto the cable in the direction of the central axis (M).

19. The device as claimed claim 14,
wherein, to delimit a maximum depth of the radial incision into the cable component, one of (i) the cable counter holder is designed to configure a detent for the cutter and (ii) the cutter is designed to configure a detent for the cable.

20. The device as claimed claim 14,
further comprises at least one of (i) a respective gate guide assembly, and (ii) a respective rail system, for actuating onto the cable at least one of (a) the cutter, (b) the cable counter holder, and (c) the at least one pull-off tool.

* * * * *